(12) United States Patent
Carter

(10) Patent No.: US 8,616,396 B2
(45) Date of Patent: Dec. 31, 2013

(54) WATER TREATMENT PRESSURE VESSEL HAVING INTERNAL CONICAL DISTRIBUTOR PLATES

(75) Inventor: Thomas G. Carter, New Bern, NC (US)

(73) Assignee: TGC Consulting, LLC, New Bern, NC (US)

( * ) Notice: Subject to any disclaimer, the term of this patent is extended or adjusted under 35 U.S.C. 154(b) by 236 days.

(21) Appl. No.: 13/044,605

(22) Filed: Mar. 10, 2011

(65) Prior Publication Data

US 2011/0220641 A1 Sep. 15, 2011

Related U.S. Application Data

(60) Provisional application No. 61/312,398, filed on Mar. 10, 2010.

(51) Int. Cl.
B65D 6/32 (2006.01)

(52) U.S. Cl.
USPC .......... 220/4.01; 220/588; 220/590; 220/592; 220/678; 210/289; 210/291; 156/308.2

(58) Field of Classification Search
USPC ......... 210/289, 291; 220/4.01, 588, 590, 592, 220/678; 156/308.2
See application file for complete search history.

(56) References Cited

U.S. PATENT DOCUMENTS

| | | | |
|---|---|---|---|
| 3,100,172 A * | 8/1963 | Nier | 220/4.21 |
| 3,557,827 A | 1/1971 | Marsh | |
| 3,662,780 A | 5/1972 | Marsh | |
| 3,893,925 A | 7/1975 | Jones | |
| 4,257,894 A | 3/1981 | Barney | |
| 4,514,242 A * | 4/1985 | MacLaughlin et al. | 156/73.5 |
| 4,579,242 A * | 4/1986 | Ellis, III | 220/4.13 |
| 4,595,037 A * | 6/1986 | LeBreton et al. | 220/4.21 |
| 5,116,491 A | 5/1992 | Brane et al. | |
| 5,378,370 A | 1/1995 | Brane et al. | |
| 5,636,738 A * | 6/1997 | Riedel | 206/403 |
| 5,865,923 A * | 2/1999 | Johnson | 220/588 |
| 6,136,076 A | 10/2000 | Read | |
| 6,199,717 B1 * | 3/2001 | Tsai | 220/723 |
| 6,401,966 B2 * | 6/2002 | Tsai | 220/723 |
| 6,592,751 B2 | 7/2003 | Haridas | |
| 7,354,495 B2 | 4/2008 | Carter et al. | |
| D591,823 S | 5/2009 | Stolarik et al. | |
| 2002/0113001 A1 * | 8/2002 | Kupke | 210/232 |
| 2004/0026431 A1 * | 2/2004 | Jones | 220/588 |
| 2006/0000839 A1 * | 1/2006 | Gremour et al. | 220/721 |
| 2008/0017653 A1 * | 1/2008 | Carter | 220/723 |
| 2009/0071965 A1 * | 3/2009 | Iida et al. | 220/586 |
| 2009/0166273 A1 | 7/2009 | Mormino et al. | |
| 2009/0188109 A1 * | 7/2009 | Bampton et al. | 29/890.01 |
| 2010/0012664 A1 | 1/2010 | Xie | |

* cited by examiner

*Primary Examiner* — Mickey Yu
*Assistant Examiner* — Brijesh V. Patel
(74) *Attorney, Agent, or Firm* — Ward and Smith, P.A.

(57) ABSTRACT

The invention provides a fiberglass reinforced plastic pressure tank including a first tank section and a second tank section; a welded diffuser plate having and a weld guide disposed about a circumference of the diffuser plate and including first and second weld grooves; a first weld joint between the first weld groove and the first tank section; a second weld joint between the second weld groove and the second tank section; wherein the welded diffuser plate forms a hermetic seal in an exterior wall of the combined tank sections, and further wherein the welded diffuser plate seals the plastic tank sections together and contains the diffuser plate inside the welded plastic tank.

14 Claims, 7 Drawing Sheets

WATER TREATMENT PRESSURE VESSEL HAVING INTERNAL CONICAL DISTRIBUTOR PLATES

1 RELATED APPLICATIONS

In addition to the patent applications cited herein, each of which is incorporated herein by reference, this patent application is related to and claims priority to U.S. Provisional Patent Application No. 61/312,398, filed on Mar. 10, 2010, entitled "Water Treatment Pressure Vessel Having Internal Conical Distributor Plates," the entire disclosure of which is incorporated herein by reference.

2 FIELD OF THE INVENTION

The present invention relates generally to a fiberglass reinforced plastic ("FRP") pressure vessel made with a plastic liner and having internal diffuser plates. The invention is generally used for residential and commercial water treatment, water conditioning, and filtration of fluids.

3 BACKGROUND OF THE INVENTION

FRP vessels have long been the standard means for water containment in water treatment, conditioning and filtration applications. FRP tanks are manufactured by several methods with the primary method being termed as "blow mold and wind" methodology. This is the process by which a plastic bottle or liner is blow molded to the required size and configuration and then reinforced for pressure capability by fiberglass filament winding. The continuous strand fiberglass is impregnated with an epoxy resin that serves as the binder between the fiberglass and the tank. The fiberglass is wound around the exterior of the tanks in a controlled method. The amount and pattern by which the fiberglass is applied determines the ultimate performance of the pressure vessels in terms of strength and durability.

Other less utilized techniques for making a FRP pressure vessel center around the various methods for making the plastic liner. They include rotational molding, split shell injection molding, and the welding of injection molded end caps to an extruded sidewall. In all cases, the final plastic bottle is wound with fiberglass to achieve the strength requirements.

The plastic bottle needed for use in the intended applications may have numerous openings. At a minimum, the tank will have one axial opening for the attachment of control valves or other connections for getting fluid in and out of the tank. The size of that opening can vary but in all cases it is smaller than the diameter of the tank. The size of the opening restricts access into the tank thereby limiting the installation of features and accessories.

One of the most desirable accessories is what is called a diffuser plate. Other names associated with a diffuser plate may be nozzle plate, filtration plate, or chamber separator plate. FRP tanks not having an internal diffuser plate have what is called a filter basket in its place. The purpose of the filter basket is to separate the clean fluid from the solid filter media. The filter basket comes in many designs but generally is small so it can be installed in the center of the bottom of the FRP tank. The filter basket is attached to a riser tube, which is a connection between the control valve and the filter basket. All water injected into or drawn from the FRP tank travels through the filter basket and the riser tube. During the cycling of a water softener, water travels through the filter media to perform the softening or cleaning process required.

With the market introduction in 2002 of a tank construction method by which injection molded end caps are welded to an extruded sidewall tube, the industry has started to demand FRP tanks with internal features and accessories. There is a need in the art for more efficient and/or better internal features of a FRP tank.

4 BRIEF DESCRIPTION OF THE INVENTION

In one embodiment, the present invention provides a pressure vessel or tank that includes a plastic liner with at least one axial opening, is typically reinforced with continuous strand fiberglass, and has at least one conical internal diffuser plate. The plastic liner may be made of any thermoplastic material suitable for use in potable water applications.

In another embodiment, the present invention provides a tank, such as an FRP tank, with a conical internal diffuser plate (also termed nozzle plate, filtration plate, or chamber separator plate). To insert the diffuser plate into the tank, a plastic liner is cut perpendicular to the axis of the tank and along the tank sidewall so as to allow complete access to the inside of the tank. The cut results in two opposing and equal surfaces that mate with weld grooves on the diffuser plate. The weld grooves may each be in a substantially U-shaped configuration with inner and outer weld walls and a connecting bottom, or any other similar shape for guiding and connecting opposing face walls. The first opposing face is welded to the mating weld groove on one side of the diffuser plate while the other opposing face is welded to the other side of the diffuser plate. The weld creates a hermetic seal between the interior of the tank and the exterior along both welds. The diffuser plate has a wall section that now becomes an extension of the tank sidewall and completes the liner. As a result, the tank liner is divided into two separate chambers and the top chamber can be filled with filter media.

In a further embodiment, the present invention provides a tank with multiple conical internal diffuser plates. As an example of a method to produce a tank with two conical diffuser plates, a plastic liner that already has an internal diffuser plate installed as described above again is cut perpendicular to the axis in any location along the sidewall of the tank. The cut results in two opposing and equal surfaces that mate with weld grooves on the diffuser plate. The first opposing face is welded to the mating weld groove on one side of the diffuser plate while the other opposing face is welded to the other side of the diffuser plate. The weld creates a hermetic seal between the interior of the tank and the exterior along both welds. The diffuser plate has a wall section that now becomes an extension of the tank sidewall and completes the liner. As a result, the tank liner is divided into three separate chambers. The top chamber can be filled with one filter media and the middle chamber can be filled with another filter media. One can envision that the present invention also provides tanks with more than one or two conical internal diffuser plates, such as three, four, five, or however many conical diffuser plates are required for the function of the tank.

The present invention provides a conically shaped diffuser plate with slotted openings radiating from the diffuser plate center and molded into the diffuser plate. The spacing and amount of slotted openings can be graduated with the greater amount of openings located towards the outside circumference of the diffuser plate. Having the spacing and amount of slotted openings graduated with the greater amount of openings located towards the outside circumference of the diffuser plate facilitates fluid migration to the outer rings due to the greater passage openings towards the outside of the tank. In a preferred embodiment, the slotted openings may have a maximum gap of approximately 0.010 inches. The conical shaped diffuser plate may have ribbing to add sufficient strength for supporting filtering media. The conically shaped diffuser plate may have tapered wall guides that position the plastic liner wall into the weld groove.

The present invention provides a means for attaching a riser tube extension when a second diffuser plate is installed into a plastic liner. This diffuser adapter or pipe fitting male adapter may be constructed of plastic or any other kind of material allowing it to function in aiding the installation of a second diffuser plate. The second diffuser plate is installed in the same manner as the first diffuser plate and is located higher in the tank than the first diffuser plate. The second diffuser plate is similar to the first installed diffuser plate with the exception of the centrally located opening. The opening on the second diffuser plate is larger than the first diffuser plate. When using the second diffuser plate, the riser tube with the pipe fitting male adapter is attached to the first diffuser plate and may be shorter than the position of the second diffuser plate, alternatively the lower riser tube may extend through and above the position of the second diffuser plate. Installation of the lower riser tube may be completed after the cut for the second diffuser plate is made and prior to the welding of the second diffuser plate, alternatively, the lower riser tube may be installed after the installation of the second diffuser plate, e.g., after the welding of the second diffuser plate. A second upper riser tube assembly is made using a threaded diffuser adapter that has a mating thread to the thread in the second diffuser. The diffuser adapter may be glued to the upper riser tube and then attached to the second diffuser plate. A mating pocket on the bottom of the diffuser adapter engages the lower riser tube creating a complete passage from the control valve to the bottom chamber.

In another aspect, the present invention provides methods for installing into the plastic liner at least one diffuser plate generally located towards the bottom of the tank. The plastic liner is cut perpendicular to the axis of the tank and along the tank sidewall so as to allow complete access to the inside of the tank. The cut results in two opposing and equal surfaces that mate with weld grooves on the diffuser plate. The first opposing face is welded to the mating weld groove on one side of the diffuser plate while the other opposing face is welded to the other side of the diffuser plate. The weld creates a hermetic seal between the interior of the tank and the exterior along both welds. The diffuser plate has a wall section that now becomes an extension of the tank sidewall and completes the liner. As a result, the tank liner is divided into two separate chambers with the ability to fill the top chamber with filter media. These methods can be employed with conical shaped diffuser plates as well as diffuser plates with other shapes. For example, a flat bottomed diffuser plate can also be inserted into a FRP tank using the methods of the present invention.

The present invention also provides methods for attaching the riser tube to a centrally located opening in the diffuser plate. A standard plastic male pipe fitting adapter is glued to the riser tube and then threaded into the corresponding threads located in the central opening of the diffuser plate. The riser tube is generally long enough to extend to the opening of the tank and mate with a control valve.

5 BRIEF DESCRIPTION OF THE DRAWINGS

6 DETAILED DESCRIPTION OF THE INVENTION

Figure 1:
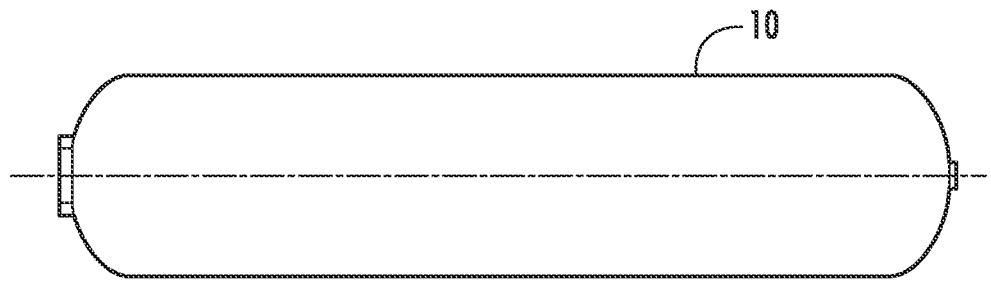
FIG. 1 illustrates an external view of an FRP tank.

The present invention relates to achieving a cost effective and improved method for installing internal diffuser plates into a tank, such as an FRP tank. In order to install diffuser plates into a plastic liner, there must be access inside the plastic liner prior to applying the continuous strand fiberglass reinforcement. One way to achieve this in the prior art is by fabricating the plastic liner in segments such as the molding of end caps, extruding a pipe-like sidewall and welding the components together to form a liner. This method requires significant investment in equipment and tooling to fabricate the numerous sizes and has a higher cost to manufacture than other alternatives.

Another way to install diffuser plates into a plastic liner in the prior art is to mold the bottle shaped liner as one piece and, using complex processes, mold the diffuser plate into the solid bottle during the molding process. This method requires extremely complex equipment and set-up operations that interrupt synchronous production operation. Additionally, the ability to locate the diffuser plate on demand is compromised as is the ability to add multiple diffuser plates. Manufacturing flexibility is limited because manufacturing equipment must be dedicated to making either type of tank, thus causing difficult production scheduling issues, increased delivery lead-times, and the carrying of inventory.

Recognizing the shortcomings of the prior art, the improved methods of the present invention allow the ability to take pre-molded plastic liners that are readily available and in production, and modify them as needed to meet customer demand. Pulling a liner out of the standard production process and customizing it according to a customer's demands is more efficient than setting up manufacturing equipment for each customized version. Having the ability to cut the pre-existing plastic liner at any position on the tank gives maximum flexibility to the manufacturing process. Interruptions are eliminated because operations can build FRP products with a diffuser plate and an infinite number of variables on demand and at the lowest cost.

Another cost effective feature of the present invention is that by having the diffuser plate located on the sidewall portion of the tank, there is a significant reduction in diffuser plate tooling expense. Locating the bottom diffuser plate in the lower dome portion requires a plate that is a size smaller than the outer diameter of a FRP tank. Making a FRP tank with both a bottom and an upper diffuser plate would require the fabrication of two different plate diameters thus requiring two different tooling sets. The present invention allows the use of one basic plate with a different center opening.

Another purpose of the present invention is to offer a diffuser plate that is less susceptible to manufacturing defects and long-term material strength and fatigue issues. The attachment of a diffuser plate to the inside wall of a plastic liner puts significant stress and fatigue loads onto the welded connection. The filter media that the diffuser plate must support is extremely heavy and an inside wall weld is placed in shear load. This heavy load, coupled with the fact that FRP tanks expand and contract significantly during cycling, makes the weld susceptible to failure.

The present invention uses the diffuser plate as an extension of the sidewall when welded to the opposing faces of the cut plastic liners. Axial loads on the weld and the actual diffuser plate are reduced since the plate is integrated into the tank sidewall. Additionally, if a diffuser plate with a conical shape is used for the methods of the present invention, the conical shape of the diffuser plate acts as a flexible membrane to absorb any expansion and contraction loads during tank cycling. Conversely, flat plates of the prior art see high stress loads on the plate itself and the inside weld during tank cycling making the plate and weld susceptible to plastic fatigue. Additionally, having a diffuser plate with a conical shape maximizes tank volume by extending into the dome area of the tank, thus using the available tank space more efficiently. Prior art flat plates leave excess space under the plate which wastes tank capacity, and in the end may result in the need for a larger tank.

Another purpose of the present invention is to offer a simplified process for filling and servicing a tank utilizing multiple diffuser plates. When filling a standard single diffuser plate FRP tank, the open end of the riser tube is simply plugged and the media is poured into the tank. In order to fill the lower chamber of a multi-plate FRP tank, the filtering media needs to go through the center of the upper plate. Therefore, the filter media intended to fill the lower chamber has to bypass the upper plate. In prior art FRP tanks that have a flat plate, simply pouring the filter media into the top opening would not work because the filter media would be caught on the upper plate. One way to avoid this problem is to insert a special tube to circumvent the upper plate and funnel the filter media to the lower chamber. The present invention provides a solution to this problem by using a conical shaped diffuser plate which acts as a funnel to assure that all filter media is in the lower chamber. In this case, no additional tools or special equipment are required.

Additionally, capping off the center opening of the upper diffuser plate is necessary in a multi-plate FRP tank. Having a threaded adapter that is directly attached to the upper riser tube allows ease of closure and ease of connection to the lower riser tube without any special equipment or tools. This is in contrast to prior art multi-plate FRP tanks where the center cap is of a snap fit design, requiring a special tool to install or remove the cap for future servicing.

Still another purpose of the present invention is to improve the efficiency of a water treatment system by increasing the effectiveness of the filtering media. In water treatment applications that use a traditional riser tube basket as the means for dispersing the fluid flow, there can be a dead zone of water flow through the filter media. This is because in general, fluid will flow to the path of least resistance, such as from high pressure to low pressure. Specifically, a water column inside a tall FRP tank, such as that of the prior art, has the lowest resistance to water flow towards the center of the column. As water exits the riser tube basket, it immediately seeks low pressure towards the center of the tank. As the fluid flows in either an upward or downward direction, it gravitates to the center of the tank until it reaches a balanced pressure. Fluid starting at the bottom will gradually flow outward as it approaches an equal pressure towards the surface. In reverse flow, fluid will equally disperse on the surface and gravitate inward to the low pressure point of the riser basket. The present invention, which employs a diffuser plate having a conical shape, spreads the dispersion of the fluid across the tank diameter so that a greater amount of filtering media is utilized. Further, the graduated slots in the diffuser plate of the present invention levels out the pressure at the face of the diffuser plate so that fluid flows uniformly through the diffuser plate. Additionally, the conical shape of the diffuser plate helps move the outbound fluid higher in the filter media so that it will remain towards the outer wall of the tank and be less susceptible to seeking the low pressure center column.

Turning to FIG. 1, this represents a horizontal exterior view of a cylindrical tank 10, such as an FRP tank. The tank 10 may be a pre-manufactured tank suitable for any filtration purpose. By way of example, the tank may be a tank used in a water filtration apparatus such as a water softener used in homes or businesses to filter out minerals and other undesirable chemicals from a ground water source and supply the filtered water to occupants and tenants of the home or business.

Figure 2:
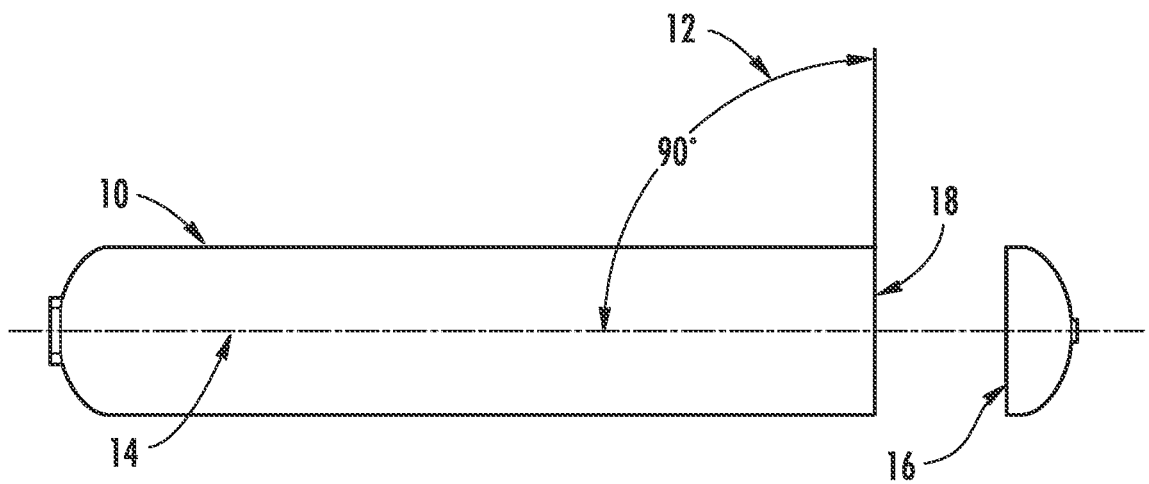
FIG. 2 illustrates an FRP tank cut perpendicular to its axis and two exposed opposing faces of each side of the cut.

Turning to FIG. 2, this represents a horizontal exterior view of a cylindrical tank 10 that has been cut to accommodate the insertion of an item to the interior of the tank 10. The cut is made at a 90-degree angle 12 to the central axis 14 of the tank 10, extending through the entire tank 10. When complete, the cut separates a desired portion of the tank 10 completely and produces a first opposing face 16 and second opposing face 18 of the side wall of the tank 10. The first opposing face 16 and second opposing face 18 are substantially mirror image sections of the same cut and may provide highly secure weld points when reconstructing the tank 10.

Figure 3:
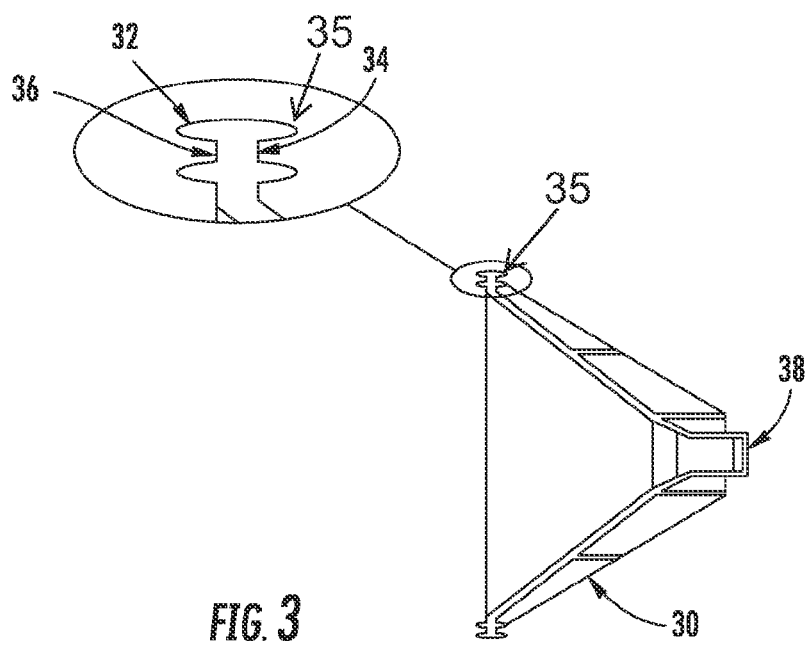
FIG. 3 illustrates a conical-shaped diffuser plate and the integral weld groove.

Turning to FIG. 3, this represents a conical shaped diffuser plate 30 to be inserted in a tank 10. The conical shaped diffuser plate 30 having a weld guide 32 with a first weld groove 34 and a second weld groove 36 for attachment to the sidewall of the tank. The conical shaped diffuser plate 30 has a centrally located opening 38 having a threaded portion. The conical shaped diffuser plate 30 typically has radiating slots that increase in frequency towards the outer perimeter of the diffuser plate 30. The first weld groove 34 and the second weld groove 36 are on opposing sides of the weld guide 32 and may be used to position the opposing faces of the tank portions into the weld grooves to form first and second weld joints. It is envisioned that the first and second weld grooves 34, 36 of the weld guide 32 may be in a substantially U-shaped configuration with inner and outer weld walls and a connecting bottom for guiding and securing of the opposing face cuts, as depicted in FIG. 3. In an alternative embodiment, the weld grooves may only comprise the inner weld wall and bottom (and not the outer weld wall) for guiding and securing of the opposing face cuts. Other configurations of the weld grooves are also envisioned.

Figure 4:
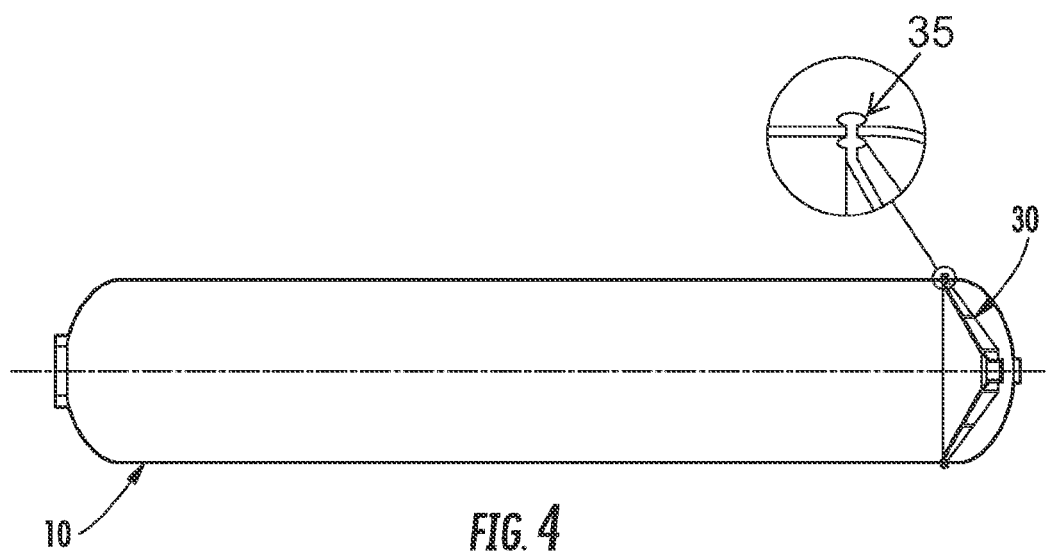
FIG. 4 illustrates a conical-shaped diffuser plate inserted into the FRP tank and welded in place.

Turning to FIG. 4, this represents an exemplary positioning of the conical shaped diffuser plate 30 when it has been welded within the tank 10. The conical shaped diffuser plate 30 is positioned between the first opposing face 16 and the second opposing face 18 cuts. The centered opening in the diffuser plate 30 is aligned with the central axis of the tank 10 with the weld grooves on the diffuser plate 30 aligned with the opposing face cuts. With the opposing face cuts aligned with the weld grooves, a first weld joint secures the first opposing face to the diffuser plate and a second weld joint secures the second opposing face to the diffuser plate such that the tank sections are securely connected to the diffuser plate with the weld guide of the diffuser plate forming a portion of the exterior wall of the tank 10.

Figure 5:
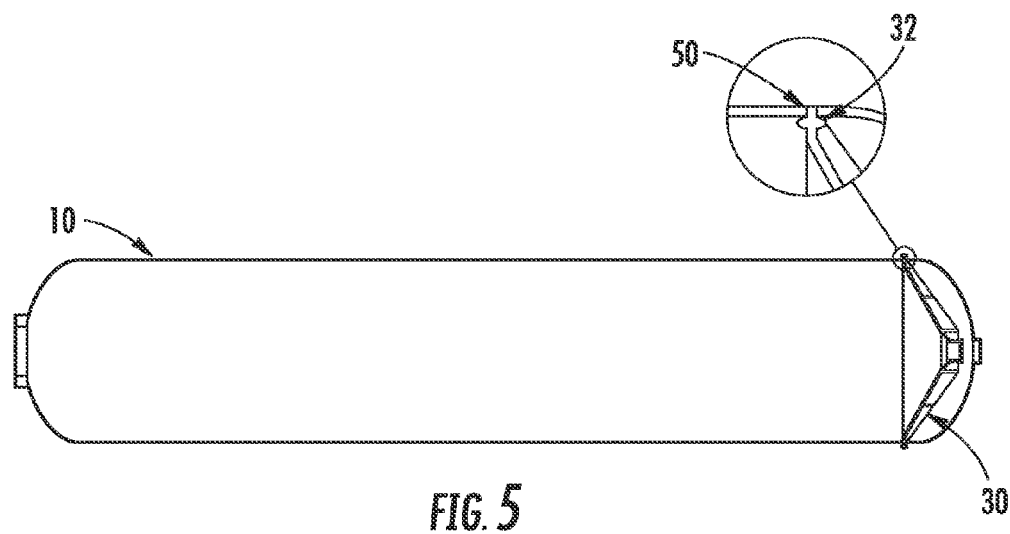
FIG. 5 illustrates an FRP tank with the outer weld guide removed.

Turning to FIG. 5, this represents an exemplary view of the tank 10 with the conical shaped diffuser plate 30 fully welded into position within the tank 10. The weld guide 32 has been completely incorporated into the sidewall 50 of the tank 10, forming a smooth, strong weld junction between the wall of the tank 10 and the conical shaped diffuser plate 30. The outer portion of the weld guide 32 that extends past the exterior wall of the tank 10, weld groove extension 35, can be removed, preserving the smooth exterior of the tank (in an alternative embodiment, only the inner weld wall and bottom are present initially, so any outer weld wall and outer portion does not need to be removed). The conical shaped diffuser plate 30 serves as an extension of the sidewall when welded to the opposing faces of the cut tank 10. Axial loads on the weld and the actual conical shaped diffuser plate 30 are reduced since the plate is integrated into the tank 10 sidewall. Additionally, if a diffuser plate with a conical shape is used as in this exemplary configuration, the conical shape of the diffuser plate acts as a flexible membrane to absorb any expansion and contraction loads of the tank sidewall during tank cycling.

Figure 6:
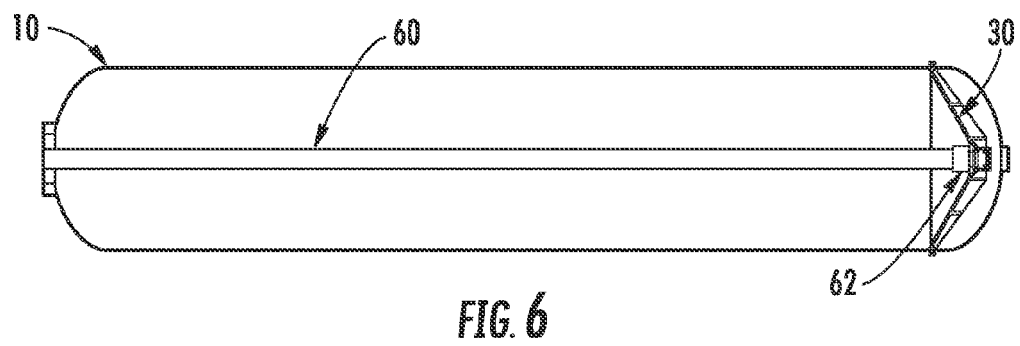
FIG. 6 illustrates an FRP tank with an inserted diffuser plate and riser tube.

Turning to FIG. 6, this represents an exemplary view of the tank 10 with a riser tube 60 inserted into the conical shaped diffuser plate 30 through the use of plastic pipe fitting adaptor 62. The riser tube 60 performs the connection between the control valve and the conical shaped diffuser plate 30. All liquid injected into or drawn from the tank 10 travels through the conical shaped diffuser plate 30 and the riser tube 60. The conical shaped diffuser plate 30 thus provides the separation between a filter medium in the tank and the liquid being filtered.

Figure 7:
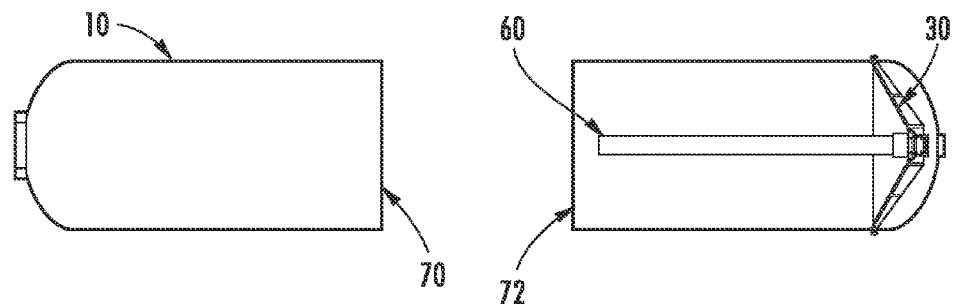
FIG. 7 illustrates an FRP tank with a second cut to install a second conical diffuser plate and riser tube.

Turning to FIG. 7, this represents an exemplary view of the preparation for the installation of an additional equipment item in the tank 10 into which a first conical shaped diffuser plate 30 and riser tube 60 have been installed. A second cut of the FRP tank 10, once again at 90 degrees to the central axis of the FRP tank 10, has been performed, separating the tank into two portions each with an opposing face (70, 72) of the cut. The riser tube 60 has been shortened and forms the bottom riser tube 62 (as shown in FIG. 8) upon the installation of additional equipment.

Figure 8:
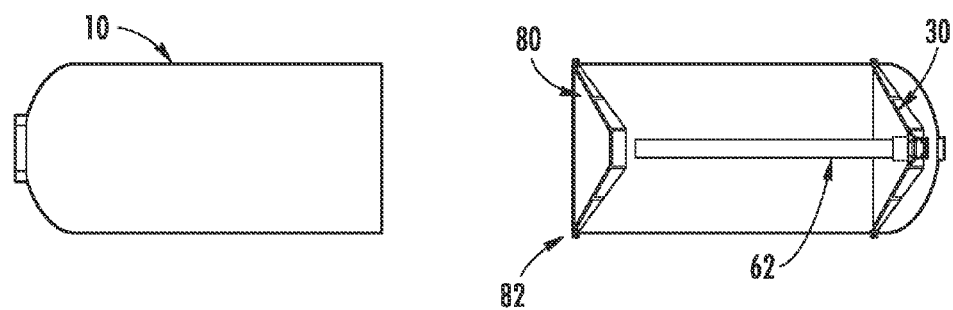
FIG. 8 illustrates an FRP tank with a second conical diffuser plate installed.

Turning to FIG. 8, this represents the installation of a second conical shaped diffuser plate 80 in the tank 10. The installation of the second conical shaped diffuser plate 80 is performed by first aligning the bottom weld groove of the weld guide of the second conical shaped diffuser plate 80 with the opposing cut face of the bottom portion 82 of the tank 10. The second conical shaped diffuser plate 80 is then welded to the bottom portion 82 of the tank 10.

Figure 9:
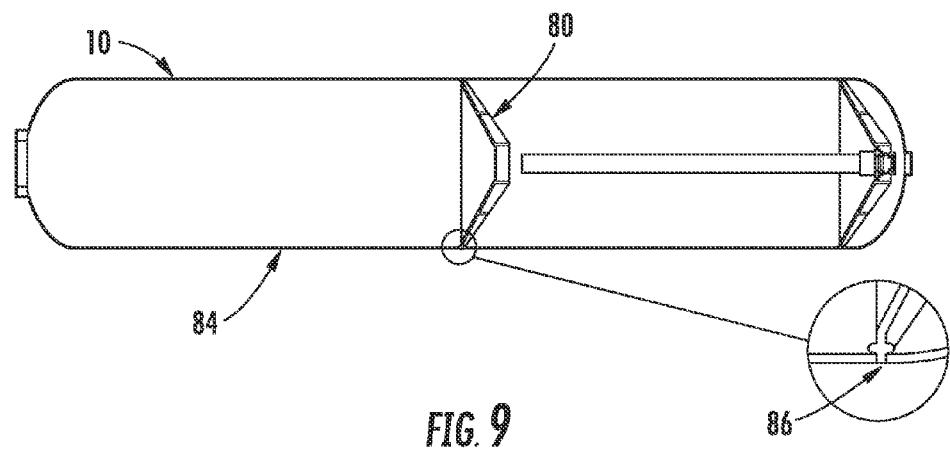
FIG. 9 illustrates an FRP tank with the outer weld guide removed from a second conical diffuser plate.

Turning to FIG. 9, this represents the attachment of the top portion 84 of the tank 10. The opposing cut face of the top portion 84 is aligned with and inserted into the top weld groove of the weld guide and then welded to the top portion 84 of the tank 10. Once again, the weld guide may extend beyond the sidewall of the tank 10. The extended portion of the weld guide may be removed to produce a smooth exterior wall 86, with the second conical shaped diffuser plate 80 securely connected to the tank 10.

Figure 10:
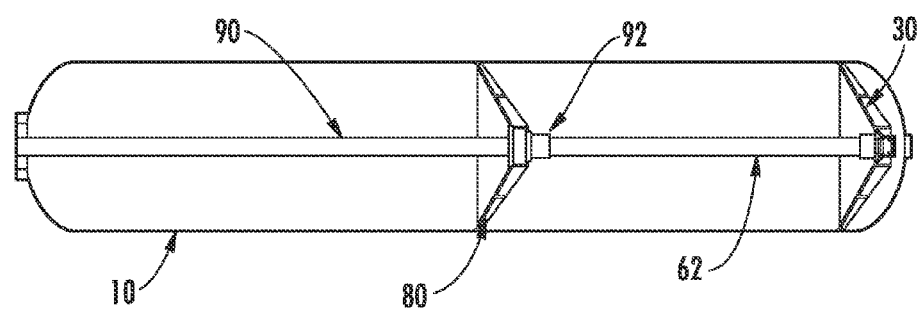
FIG. 10 illustrates an FRP tank with two conical diffuser plates and an integrated riser tube.

Turning to FIG. 10, this represents the completion of the installation of the second conical shaped diffuser plate 80. With the weld complete and holding the second conical shaped diffuser plate 80 securely in place, an upper riser tube 90 is installed to allow the flow of liquid into and out of the tank 10. The upper riser tube 90 is inserted through an opening in the center of the second conical shaped diffuser plate and attached to the bottom riser tube 62 through the use of a diffuser adaptor 92 that connects the upper riser tube 90 to the bottom riser tube 62 with a waterproof seal. The second conical shaped diffuser plate 80 central opening is also adapted to permit the flow of filter media from the upper chamber formed by the installation of the second conical shaped diffuser plate 80, into the bottom, or lower, chamber that has the first conical shaped diffuser plate 30 as the base of the lower chamber. The conical shape of the diffuser plate permits filter media poured into the top of the tank 10 to flow down the sloped sides of the diffuser plate, through the adapted central opening of the diffuser plate, and down into the lower chamber. The filter media intended for the lower chamber may be poured into the tank prior to the installation of the upper riser tube 90. Capping off the center opening of the upper diffuser plate is necessary in a multi-plate tank 10. Having a threaded adapter that is directly attached to the upper riser tube allows ease of closure and ease of connection to the lower riser tube 62 without any special equipment or tools. In this example, a tank 10 having two chambers, each with potentially a different filter medium installed may be easily manufactured and assembled.

Figure 11:
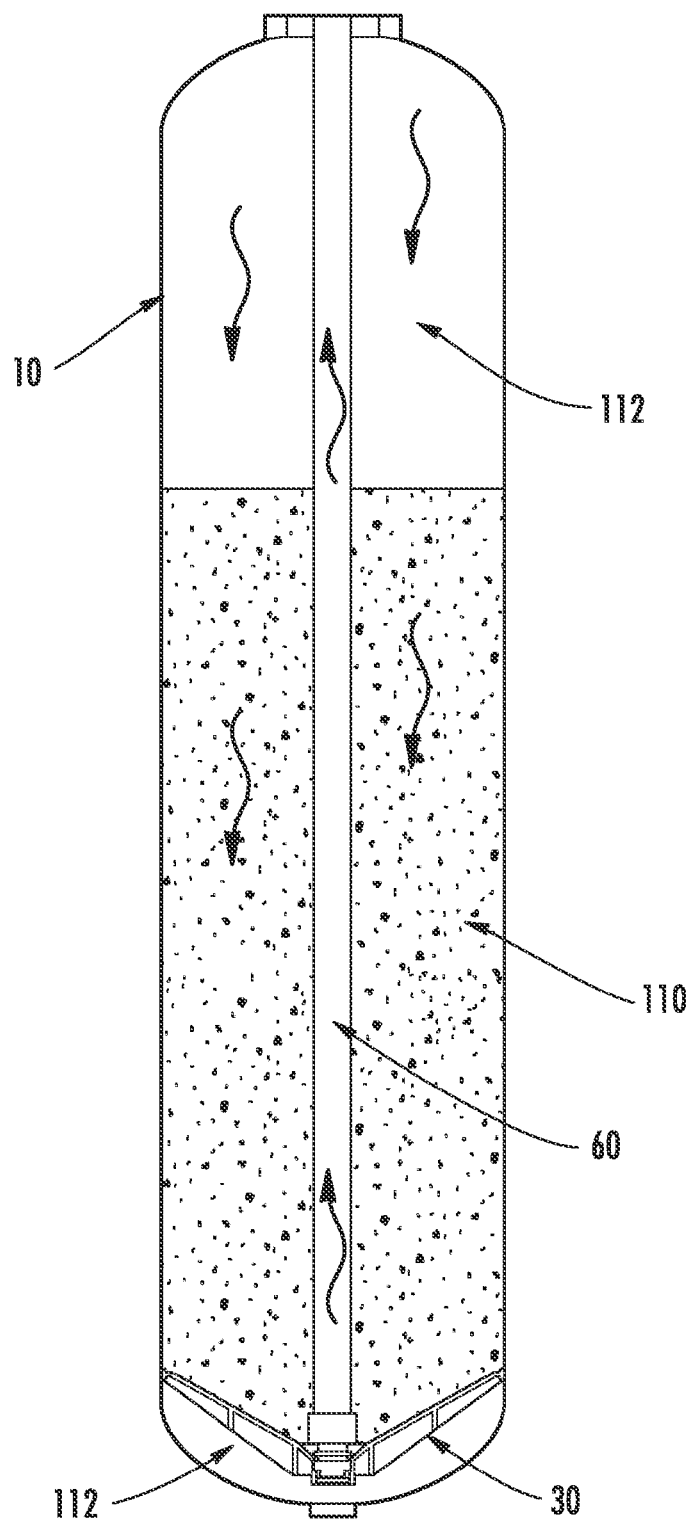
FIG. 11 illustrates an FRP tank with installed diffuser plate and riser tube and filter media.

Turning now to FIG. 11, this figure presents an exemplary view of a tank 10 having a single conical shaped diffuser plate 30 and configured and prepped for use as a water softener. The filter media 110 is emplaced within the tank 10 and directly supported by the conical shaped diffuser plate 30. The riser tube 60 transports the liquid 112, in this example the liquid is water, from the bottom of the tank below the conical shaped diffuser plate 30 and out of the tank for use in a home or business (after filtration). In this system, no gravel is required in the bottom of the tank.

Figure 12:
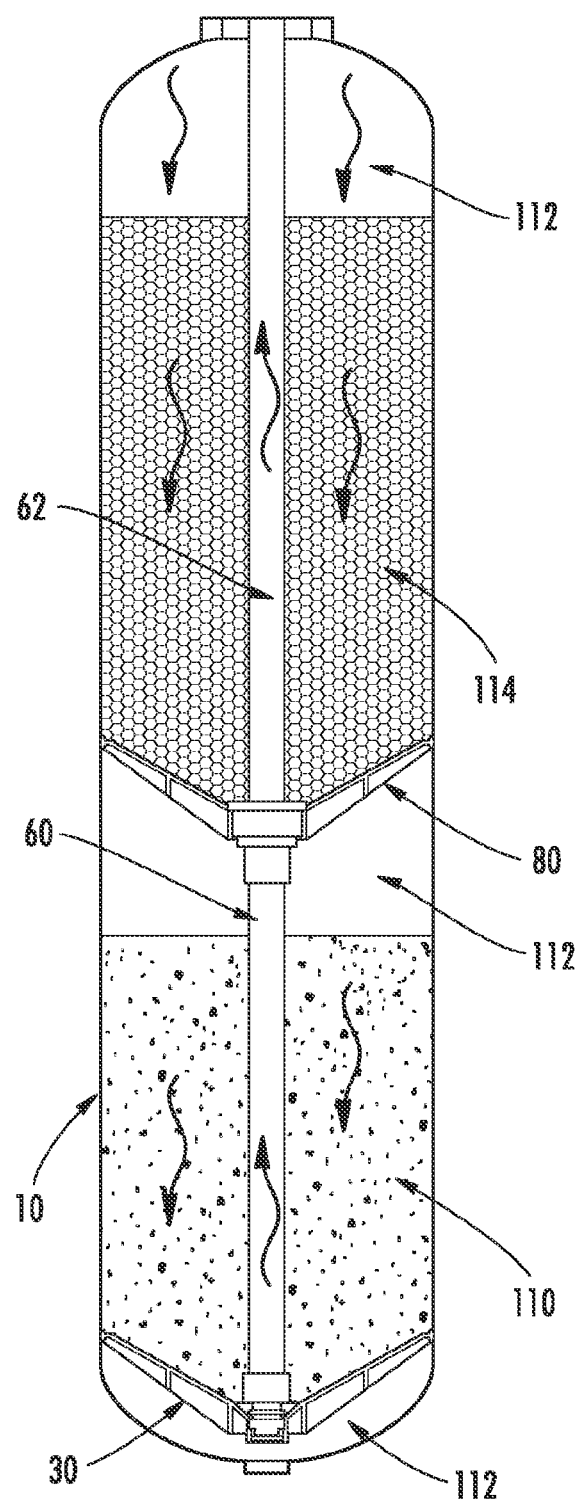
FIG. 12 illustrates an FRP tank with multiple installed diffuser plates, a riser tube and multiple filter media.

Turning now to FIG. 12, this figure presents an exemplary view of a tank 10 having a first conical shaped diffuser plate 30 and a second conical shaped diffuser plate 80 installed within the tank 10 to provide a dual filtration system. In this example, the tank 10 has a first layer of filter media 110 in the lower chamber and a second layer of filter media 114 in the upper chamber. The first layer of filter media 110 is supported by the first conical shaped diffuser plate 30 and the second layer of filter media 114 is supported by the second conical shaped diffuser plate 80, providing for at least a two stage filtration of the liquid 112 introduced into the tank 10. Once again, the riser tube 60 transports the filtered liquid 112 out of the tank for use in a home or business (after filtration).

7 CONCLUDING REMARKS

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicant's invention set forth in this specification, and neither its use nor its absence is intended to limit the scope of the applicant's invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Further-more, the foregoing description is for the purpose of illustration only, and not for the purpose of limitation.

I claim:

1. A cylindrical plastic tank apparatus comprising:
    a first tank section and a second tank section of the plastic tank;
    a first face of a tank wall at an end of the first tank section and an opposing second face of a tank wall at an end of the second tank section;
    a welded diffuser plate having substantially a same diameter as the cylindrical plastic tank sections and a weld guide disposed about a circumference of the diffuser plate and comprising first and second weld grooves;
    a first weld joint between the first weld groove of the diffuser plate and the first tank section;
    a second weld joint between the second weld groove of the diffuser plate and the second tank section; and
    wherein the first face of the tank wall and the opposing second face of the tank wall are separated by the welded diffuser plate which is disposed therebetween and comprises a separate section therefrom while forming a hermetic seal with an exterior wall of the combined tank sections, and further wherein the welded diffuser plate seals the plastic tank sections together and contains the diffuser plate inside the welded plastic tank.

2. The apparatus of claim 1, wherein the diffuser plate comprises a conical shaped diffuser plate.

3. The apparatus of claim 2, wherein the conical shaped diffuser plate has a central circular opening of a pre-determined diameter.

4. The apparatus of claim 3, wherein a circular tube with a diameter smaller than the pre-determined diameter of the central circular opening of the conical shaped diffuser plate is connected to the conical shaped diffuser plate at the central circular opening.

5. The apparatus of claim 1, wherein the first and second weld grooves of the diffuser plate each comprise a substantially U-shaped configuration with inner and outer weld walls and a connecting bottom.

6. The apparatus of claim 1, wherein the first and second weld grooves of the diffuser plate comprise a first weld groove on one side of the weld guide and a second weld groove on the opposite side of the weld guide, each weld groove extending beyond the exterior wall of the plastic tank as weld groove extensions.

7. The apparatus of claim 6, wherein the first face of the tank wall at the end of the first tank section is welded into the first weld groove and the opposing second face of the tank wall at the end of the second tank section is welded into the second weld groove.

8. The apparatus of claim 7, wherein the weld groove extensions are removed after the welding of the opposing faces of the tank wall at the end of the first tank section and the tank wall at the end of the second tank section into the weld grooves to produce a smooth exterior tank wall with the weld guide of the diffuser plate integral to the tank wall.

9. A cylindrical plastic tank system comprising:
    a first tank section and a second tank section of the plastic tank;
    a first face of a tank wall at an end of the first tank section and an opposing second face of a tank wall at an end of the second tank section;
    a conical shaped welded diffuser plate having substantially a same diameter as the cylindrical plastic tank sections and a weld guide disposed about a circumference of the conical shaped diffuser plate and comprising first and second weld grooves;
    a first weld joint between the first weld groove of the conical shaped diffuser plate and the first tank section;
    a second weld joint between the second weld groove of the conical shaped diffuser plate and the second tank section; and
    wherein the first face of the tank wall and the opposing second face of the tank wall are separated by the welded conical shaped diffuser plate which is disposed therebetween and comprises a separate section therefrom while forming a hermetic seal with an exterior wall of the combined tank sections, and further wherein the welded diffuser plate seals the plastic tank sections together and contains the conical shaped diffuser plate inside the welded plastic tank.

10. The system of claim 9, wherein the conical shaped diffuser plate has a central circular opening of a pre-determined diameter.

11. The system of claim 10, wherein a circular tube with a diameter smaller than the pre-determined diameter of the central circular opening of the conical shaped diffuser plate is connected to the conical shaped diffuser plate at the central circular opening.

12. The system of claim 9, wherein the first and second weld grooves of the conical shaped diffuser plate each comprise a substantially U-shaped configuration with inner and outer weld walls and a connecting bottom.

13. The system of claim 9, wherein the first and second weld grooves of the conical shaped diffuser plate comprise a first weld groove on one side of the weld guide and a second weld groove on the opposite side of the weld guide, each weld groove extending beyond the exterior wall of the plastic tank as weld groove extensions.

14. The system of claim 13, wherein the first face of the tank wall at the end of the first tank section is welded into the first weld groove and the opposing second face of the tank wall at the end of the second tank section is welded into the second weld groove and the weld groove extensions are removed after the welding of the opposing faces of the tank wall at the end of the first tank section and the tank wall at the end of the second tank section into the weld grooves to produce a smooth exterior tank wall with the weld guide of the conical shaped diffuser plate integral to the tank wall.

* * * * *